US012627384B2

(12) United States Patent
Chen et al.

(10) Patent No.: US 12,627,384 B2
(45) Date of Patent: May 12, 2026

(54) CALIBRATION METHOD TO FIND IMPEDANCE OF RADIO FREQUENCY FRONT-END (RFFE)

(71) Applicant: MEDIATEK INC., Hsinchu City (TW)

(72) Inventors: Chun-Hsiang Chen, Hsinchu City (TW); Chin-Wei Hsu, Hsinchu City (TW); Po-Chung Hsiao, Hsinchu City (TW); Sin-Sheng Wong, Hsinchu City (TW); Yen-Liang Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 348 days.

(21) Appl. No.: 18/531,888

(22) Filed: Dec. 7, 2023

(65) Prior Publication Data

US 2025/0192900 A1     Jun. 12, 2025

(51) Int. Cl.
| | |
|---|---|
| *H01Q 1/50* | (2006.01) |
| *H01Q 9/06* | (2006.01) |
| *H04B 1/04* | (2006.01) |
| *H04B 17/21* | (2015.01) |

(52) U.S. Cl.
CPC ................................. *H04B 17/221* (2023.05)

(58) Field of Classification Search
None
See application file for complete search history.

(56) References Cited

U.S. PATENT DOCUMENTS

| | | | | |
|---|---|---|---|---|
| 8,112,043 | B2 * | 2/2012 | Knudsen | H04B 17/103 |
| | | | | 455/115.2 |
| 8,131,232 | B2 * | 3/2012 | Muhammad | H04B 1/0458 |
| | | | | 455/114.2 |
| 9,083,317 | B2 * | 7/2015 | Seth | H04B 17/12 |
| 9,203,138 | B2 * | 12/2015 | Bavisi | H01Q 1/243 |
| 9,479,130 | B2 * | 10/2016 | Sheynman | H04B 1/18 |
| 9,509,348 | B1 * | 11/2016 | Daminski | H03F 3/24 |
| 9,698,758 | B2 * | 7/2017 | Spears | H04B 1/0458 |
| 9,979,080 | B2 * | 5/2018 | van Bezooijen | H04B 1/0458 |
| 10,816,581 | B2 * | 10/2020 | Solomko | G01R 27/06 |
| 10,938,425 | B2 * | 3/2021 | Itkin | H04B 17/12 |
| 11,050,446 | B2 * | 6/2021 | Lim | H04B 17/103 |
| 12,074,648 | B2 * | 8/2024 | Spits | H04B 17/12 |
| 12,160,278 | B2 * | 12/2024 | Lim | H04B 1/18 |

* cited by examiner

*Primary Examiner* — Tuan A Tran

(74) *Attorney, Agent, or Firm* — McClure, Qualey & Rodack, LLP

(57)          ABSTRACT

A calibration method to find the impedance of a radio frequency front-end (RFFE) is provided. The RFFE includes a feedback end and a tuner. The tuner is set to a first predetermined setting to have a first impedance. An output end of the tuner is set to different calibration settings. The first reflection coefficient sets at the feedback end is obtained. The second impedance from the feedback end of the RFFE to an input end of the tuner is calculated based on the first reflection coefficient. The tuner is set to a second predetermined setting. The second reflection coefficient sets at the feedback end is obtained. The third impedance of the tuner in the second predetermined setting is calculated based on the second impedance from the feedback end of the RFFE to the input end of the tuner and the second reflection coefficient sets.

20 Claims, 5 Drawing Sheets

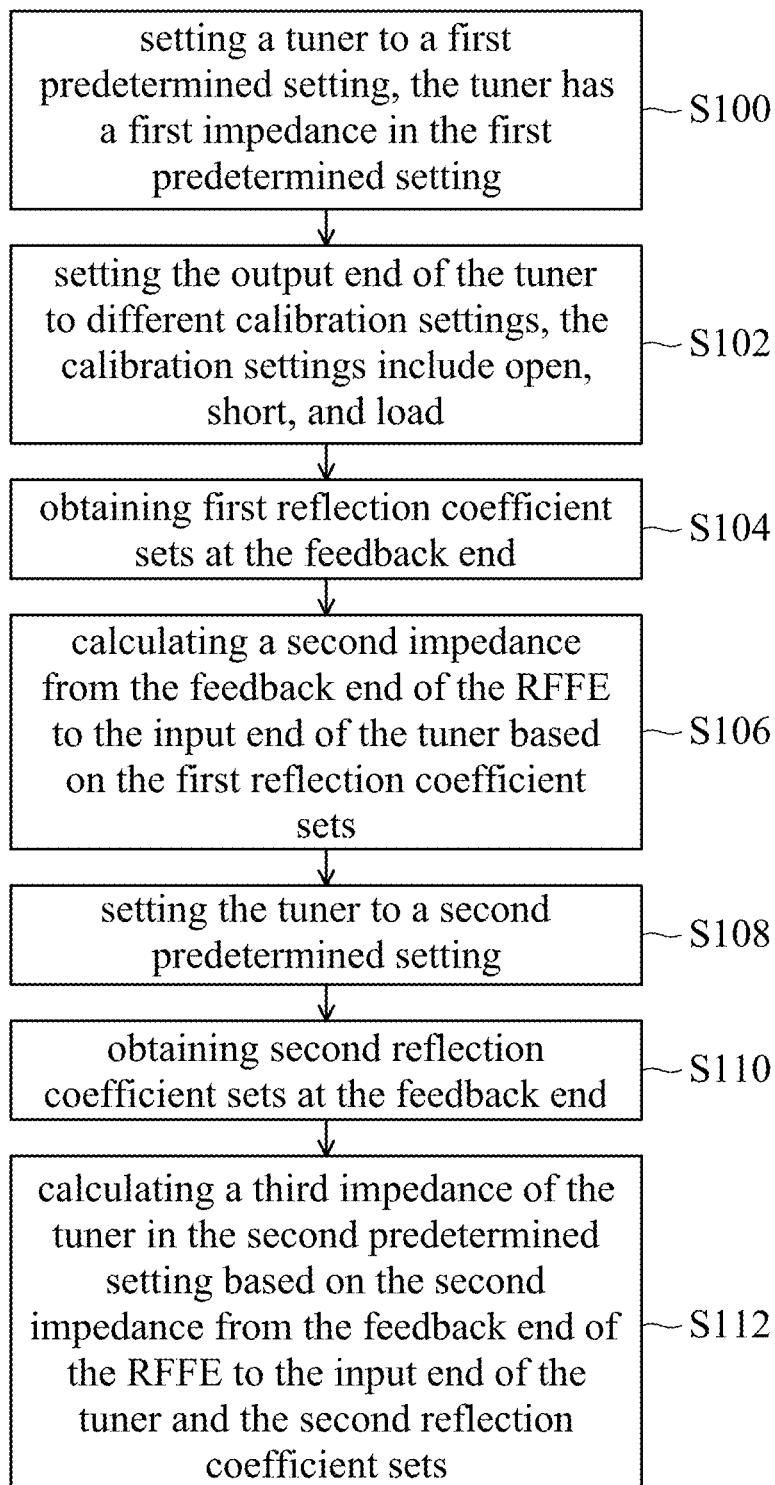

setting a tuner to a first predetermined setting, the tuner has a first impedance in the first predetermined setting ～S100 setting the output end of the tuner to different calibration settings, the calibration settings include open, short, and load ～S102 obtaining first reflection coefficient sets at the feedback end ～S104 calculating a second impedance from the feedback end of the RFFE to the input end of the tuner based on the first reflection coefficient sets ～S106 setting the tuner to a second predetermined setting ～S108 obtaining second reflection coefficient sets at the feedback end ～S110 calculating a third impedance of the tuner in the second predetermined setting based on the second impedance from the feedback end of the RFFE to the input end of the tuner and the second reflection coefficient sets ～S112

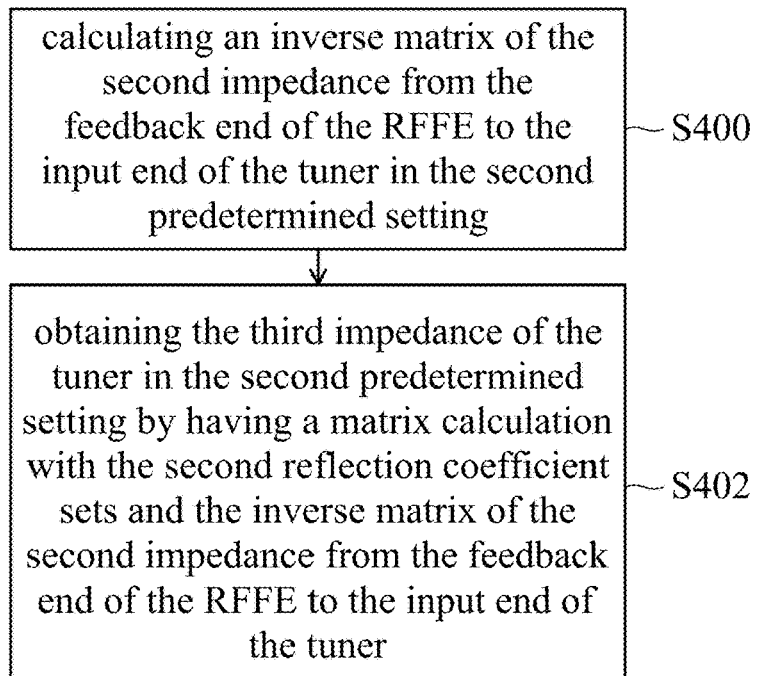

calculating an inverse matrix of the second impedance from the feedback end of the RFFE to the input end of the tuner in the second predetermined setting ~ S400 obtaining the third impedance of the tuner in the second predetermined setting by having a matrix calculation with the second reflection coefficient sets and the inverse matrix of the second impedance from the feedback end of the RFFE to the input end of the tuner ~ S402

FIG. 4

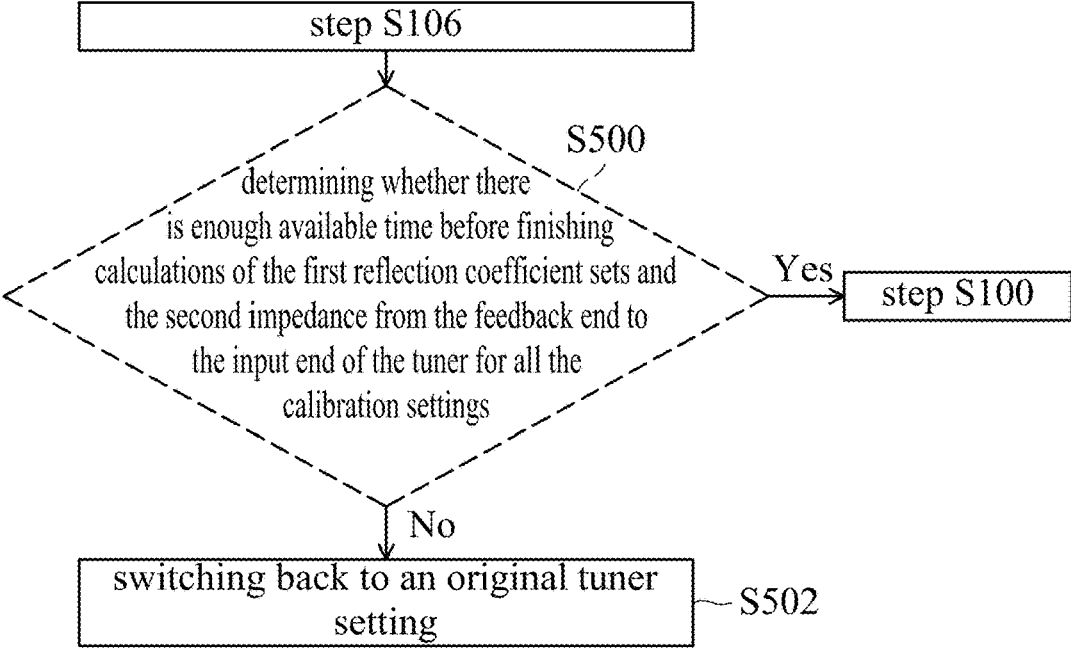

step S106 determining whether there is enough available time before finishing calculations of the first reflection coefficient sets and the second impedance from the feedback end to the input end of the tuner for all the calibration settings S500

Yes → step S100

No switching back to an original tuner setting ~ S502

CALIBRATION METHOD TO FIND IMPEDANCE OF RADIO FREQUENCY FRONT-END (RFFE)

BACKGROUND OF THE INVENTION

Field of the Invention

The present invention relates to a radio frequency front-end (RFFE), and, in particular, to a calibration method to find the impedance of an RFFE.

Description of the Related Art

The capability to make an accurate environmental detection will profoundly impact the performance of an antenna. Impedance measurement is one of the most efficient methods for the antenna related technology, and RFFE calibration is a critical part of this technology.

In the prior art of the RFFE, there is a radio frequency printed circuit board (RFPCB) disposed between a tuner and an input end of the RFFE. However, it is hard to separate the RFPCB calibration and tuner calibration individually, which often require large amount of training data and calibration timing. When there is no built-in calibration kit at tuner input, e.g., OSL kit, it is hard to calibrate the impedance of the feedback path and the S parameter individually, so the calibrating timing and effort become large.

BRIEF SUMMARY OF THE INVENTION

An embodiment of the present invention provides a calibration method to find the impedance of a radio frequency front-end (RFFE). The RFFE includes a feedback end and a tuner. The tuner includes an input end coupled to the feedback end and an output end coupled to an antenna. The calibration method includes the following stages. The tuner is set to a first predetermined setting. The tuner has a first impedance in the first predetermined setting. The output end of the tuner is set to different calibration settings. The calibration settings include open, short, and load. The first reflection coefficient sets at the feedback end is obtained. The second impedance from the feedback end of the RFFE to the input end of the tuner is calculated based on the first reflection coefficient sets. The tuner is set to a second predetermined setting. The second reflection coefficient sets at the feedback end is obtained. The third impedance of the tuner in the second predetermined setting is calculated based on the second impedance from the feedback end of the RFFE to the input end of the tuner and the second reflection coefficient sets.

The calibration method further includes the following stage. The method is finished after calculating the first reflection coefficient sets at the feedback end, the second impedance from the feedback end of the RFFE to the input end of the tuner, the second reflection coefficient sets at the feedback end, and the third impedance of the tuner for all the calibration settings.

According to the calibration method described above, the third impedance of the tuner in the second predetermined setting is an S parameter of the tuner in the second predetermined setting.

According to the calibration method described above, the first reflection coefficient sets at the feedback end, the second impedance from the feedback end of the RFFE to the input end of the tuner, the second reflection coefficient sets at the feedback end, and the third impedance of the tuner are matrices.

According to the calibration method described above, the step of calculating the second impedance from the feedback end of the RFFE to the input end of the tuner based on the first reflection coefficient sets includes the following stages. The inverse matrix of the first impedance of the tuner in the first predetermined setting is calculated. The second impedance from the feedback end of the RFFE to the input end of the tuner is obtained by having a matrix calculation with the first reflection coefficients at the feedback end and the inverse matrix of the first impedance of the tuner in the first predetermined setting.

According to the calibration method described above, the step of calculating the third impedance of the tuner in the second predetermined setting based on the second impedance from the feedback end of the RFFE to the input end of the tuner and the second reflection coefficient sets includes the following stages. The inverse matrix of the second impedance from the feedback end of the RFFE to the input end of the tuner in the second predetermined setting is calculated. The third impedance of the tuner in the second predetermined setting is obtained by having the matrix calculation with the second reflection coefficient sets and the inverse matrix of the second impedance from the feedback end of the RFFE to the input end of the tuner.

The calibration method further includes the following stages. It is determined that there is enough time available before finishing the calculations of the first reflection coefficient sets of the tuner and the second impedance from the feedback end to the input end of the tuner for all the calibration settings. The step of setting the tuner to the first predetermined setting is returned back.

The calibration method further includes the following stages. It is determined that there is not enough time available before finishing the calculations of the first reflection coefficient sets at the feedback end and the second impedance from the feedback end to the input end of the tuner for all the calibration settings. The original tuner setting is restored.

The calibration method further includes the following stages. It is determined that there is enough time available before finishing the calculations of the second reflection coefficient sets at the feedback end, and the third impedance of the tuner for all the calibration settings. It is determined to return back to the step of setting the tuner to the second predetermined setting.

The calibration method further includes the following stages. It is determined that there is not enough time available before finishing the calculations of the second reflection coefficient sets at the feedback end, and the third impedance of the tuner for all the calibration settings. The original tuner setting is restored.

The calibration method further includes the following stages. The input end of the tuner is set to said calibration setting. The second impedance from the feedback end of the RFFE to the input end of the tuner are obtained based on said calibration setting at the input end of the tuner.

The calibration method further includes the following stages. The step of setting the tuner to the first predetermined setting is repeated after performing the step of calculating the third impedance of the tuner in the second predetermined setting based on the second impedance from the feedback end of the RFFE to the input end of the tuner and the second reflection coefficient sets.

According to the calibration method described above, the step of obtaining the first reflection coefficient sets at the feedback end includes the following stages. A modulation signal or a tone-signal is input into the feedback end of the RFFE to obtain the first reflection coefficient sets at the feedback end. The first reflection coefficient sets are obtained by calculation.

According to the calibration method described above, the step of obtaining the second reflection coefficient sets at the feedback end includes the following stages. A modulation signal or a tone-signal is input into the feedback end of the RFFE to obtain the second reflection coefficient sets at the feedback end. The second reflection coefficient sets are obtained by calculation.

According to the calibration method described above, the calibration method is performed in any period without transmission or reception in an over-the-air (OTA) environment.

According to the calibration method described above, the RFFE further comprises a coupler and an antenna network. The coupler is electrically connected to the feedback end of the RFFE. The antenna network is electrically connected between the coupler and the tuner.

According to the calibration method described above, the step of setting the output end of the tuner to said calibration setting includes the following stages. External calibration kits relative to said calibration setting are installed at the output end of the tuner. Alternatively, the output end of the tuner is connected to a port of a spectrum analyzer, and the impedance of the port is set to said calibration setting.

The calibration method further includes the following stages. The third impedance of the tuner is associated with the second predetermined setting to generate mapping data. The mapping data is store in a memory.

According to the calibration method described above, the step of setting the input end of the tuner to said calibration setting includes the following stage. The input end of the tuner is set to said calibration setting by simulation, calculation, or measurement.

According to the calibration method described above, the step of setting the output end of the tuner to said calibration setting includes the following stage. The output end of the tuner is set to said calibration setting by simulation or calculation.

BRIEF DESCRIPTION OF THE DRAWINGS

The present invention can be more fully understood by reading the subsequent detailed description and examples with references made to the accompanying drawings, wherein:

FIG. 1 is a flow chart of a calibration method to find the impedance of a radio frequency front-end (RFFE) in accordance with some embodiments of the present invention.

FIG. 4 is a detail flow chart of step S112 in FIG. 1 in accordance with some embodiments of the present invention.

FIG. 5 is a flow chart of additional steps of the calibration method in FIG. 1 in accordance with some embodiments of the present invention.

DETAILED DESCRIPTION OF THE INVENTION

Figure 2:
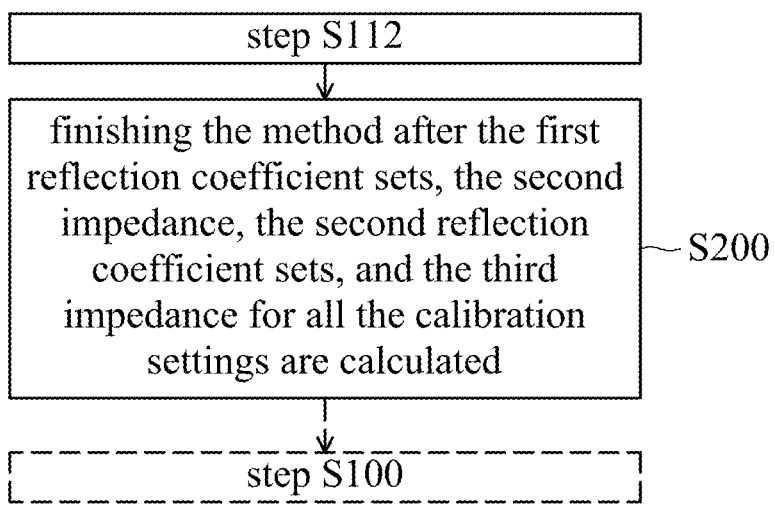
FIG. 2 is a flow chart of additional steps of the calibration method in FIG. 1 in accordance with some embodiments of the present invention.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present invention are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

FIG. 1 is a flow chart of a calibration method to find the impedance of a radio frequency front-end (RFFE) in accordance with some embodiments of the present invention. In some embodiments, the RFFE includes a feedback end and a tuner. The tuner includes an input end coupled to the feedback end and an output end coupled to an antenna (please refer to FIG. 8). As shown in FIG. 1, the calibration method includes the following stages. The tuner is set to a first predetermined setting. The tuner has a first impedance in the first predetermined setting (step S100). The output end of the tuner is set to different calibration settings. The calibration settings include open, short, and load (step S102). A first reflection coefficient sets at the feedback end are obtained (step S104). The second impedance from the feedback end of the RFFE to the input end of the tuner is calculated based on the first reflection coefficient sets (step S106). The tuner is set to a second predetermined setting (step S108). The second reflection coefficient sets at the feedback end is obtained (step S110). The third impedance of the tuner in the second predetermined setting is calculated based on the second impedance from the feedback end of the RFFE to the input end of the tuner and the second reflection coefficient sets (step S112).

In some embodiments, the RFFE is included in a mobile device, such as a smart phone, and a tablet, but the present invention is not limited thereto. The mobile device further includes a processor to execute a calibration algorithm to find a real-time impedance of the RFFE. That is, the processor executes the calibration algorithm to perform steps S100~S112 in FIG. 1. The tuner has multiple predetermined settings, and each of which corresponds to one impedance (or S parameter) of the tuner. For example, in step S100, the mapping between the first predetermined setting and the first impedance is known by previous simulation, calculation, or measurement. In some embodiments, the mobile device further includes a memory to store mapping data associated with the first predetermined setting and the first impedance. In some embodiments, the first impedance of the tuner is a matrix, for example, a 2×2 matrix (that is, the matrix with two rows and two columns), but the present invention is not limited thereto.

In some embodiments of step S102, the calibration method of the present invention installs external calibration kits relative to said calibration setting at the output end of the tuner. In some embodiments of step S102, when the tuner includes internal calibration kits, the calibration method of the present invention directly sets the internal calibration kits to the different internal calibration kits at the output end of the tuner. In some embodiments of step S102, the calibration method of the present invention connects the output end of the tuner to a port of a spectrum analyzer, and sets the impedance of the port to said calibration setting. In some embodiments of step S102, the calibration method of the present invention sets the output end of the tuner to said calibration setting by simulation, or calculation.

In some embodiments of step S104, the first reflection coefficient sets at the feedback end for the O, S, and L is a number, but the present invention is not limited thereto. For example, when the calibration setting is open (O), the first reflection coefficient as one number is obtained. When the calibration setting is short(S), the first reflection coefficient as another number is obtained. In some embodiments of step S104, the calibration method of the present invention inputs a modulation signal or a tone-signal into the feedback end of the RFFE to obtain the first reflection coefficient sets at the feedback end. In some embodiments, the calibration method of the present invention obtains the first reflection coefficient sets by calculation. For example, when the calibration setting is open, a first reflection coefficient among the first reflection coefficient sets is obtained. When the calibration setting is load, a second reflection coefficient among the first reflection coefficient sets is obtained. When the calibration setting is short, a third reflection coefficient among the first reflection coefficient sets is obtained. In step S106, the calibration method of the present invention calculates a second impedance from the feedback end of the RFFE to the input end of the tuner based on the first reflection coefficient. The detail steps of step S106 may be described in FIG. 3. In some embodiments of step S106, the second impedance from the feedback end of the RFFE to the input end of the tuner is a matrix, for example, a 2×2 matrix, but the present invention is not limited thereto.

In some embodiments, steps S100, S102, S104, and S106 may be regarded as feedback path calibration steps. That is, after the feedback path calibration steps are performed, the second impedance from the feedback end of the RFFE to the input end of the tuner may be obtained.

In step S108, the calibration method of the present invention sets the tuner to a second predetermined setting. The calibration method of the present invention is going to calculate the corresponding impedance of the tuner in the second predetermined setting. Therefore, in step S110, the calibration method of the present invention obtains second reflection coefficient sets at the feedback end. In some embodiments of step S110, the calibration method of the present invention inputs a modulation signal or a tone-signal into the feedback end of the RFFE to obtain the second reflection coefficient sets at the feedback end. For example, when the calibration setting is open, a fourth reflection coefficient among the second reflection coefficient sets is obtained. When the calibration setting is load, a fifth reflection coefficient among the second reflection coefficient sets is obtained. When the calibration setting is short, a sixth reflection coefficient among the second reflection coefficient sets is obtained. The calibration method of the present invention obtains the second reflection coefficient sets by calculation. In some embodiments of step S110, the second reflection coefficient sets at the feedback end is a number, but the present invention is not limited thereto.

After that, in step S112, the calibration method of the present invention calculates a third impedance of the tuner in the second predetermined setting based on the second impedance from the feedback end of the RFFE to the input end of the tuner and the second reflection coefficient sets. The detail steps of step S112 may be described in FIG. 4. In some embodiments of step S112, the third impedance of the tuner is a matrix, for example, a 2×2 matrix, but the present invention is not limited thereto. In some embodiments, the third impedance of the tuner in the second predetermined setting is an S parameter of the tuner in the second predetermined setting. In some embodiments, steps S108, S110, and S112 may be regarded as S parameter (of the tuner) calibration steps. That is, after the S parameter calibration steps are performed, the S parameter of the tuner in different predetermined settings of the tuner may be calibrated.

In some embodiments, after step S112 is performed, the calibration method of the present invention associates the third impedance of the tuner with the second predetermined setting to generate mapping data. Then, the calibration method of the present invention stores the mapping data in the memory. When the RFFE detects a change in the environment through the antenna, the calibration method of the present invention may select the proper calibration setting stored in the memory, so that the impedance corresponding to the proper calibration setting may be used to compensate for the impedance change due to the environmental change.

FIG. 2 is a flow chart of additional steps of the calibration method in FIG. 1 in accordance with some embodiments of the present invention. As shown in FIG. 2, after step S112 is performed, the calibration method of the present invention finishes the method including the feedback path calibration steps and the S parameter calibration steps after the first reflection coefficient sets in step S104, the second impedance in step S106, the second reflection coefficient sets in step S110, and the third impedance in step S112 for short, open, and load are all calculated (step S200). In some embodiments, after step S200 is performed, the calibration method of the present invention may repeat step S100, so that the S parameter of the tuner for different predetermined settings may be iteratively calibrated. In some embodiments, the calibration method of the present invention is performed in any period without transmission or reception for the mobile device in an over-the-air (OTA) environment.

Figure 3:
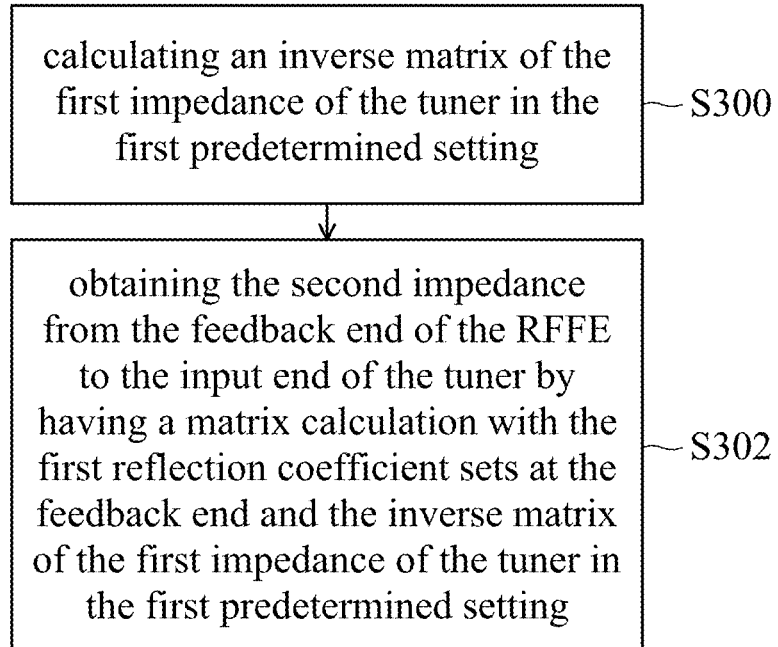
FIG. 3 is a detail flow chart of step S106 in FIG. 1 in accordance with some embodiments of the present invention.

FIG. 3 is a detail flow chart of step S106 in FIG. 1 in accordance with some embodiments of the present invention. As shown in FIG. 3, in step S106, the calibration method of the present invention calculates the inverse matrix of the first impedance of the tuner in the first predetermined setting (step S300). After that, the calibration method of the present invention obtains the second impedance from the feedback end of the RFFE to the input end of the tuner by having a matrix calculation with the first reflection coefficient sets at the feedback end and the inverse matrix of the first impedance of the tuner in the first predetermined setting (step S302).

FIG. 4 is a detail flow chart of step S112 in FIG. 1 in accordance with some embodiments of the present invention. As shown in FIG. 4, in step S112, the calibration method of the present invention calculates the inverse matrix of the second impedance from the feedback end of the RFFE to the input end of the tuner in the second predetermined setting (step S400). After that, the calibration method of the present invention obtains the third impedance of the tuner in the second predetermined setting by having a matrix calculation with the second reflection coefficient sets and the inverse matrix of the second impedance from the feedback end of the RFFE to the input end of the tuner (step S402).

FIG. 5 is a flow chart of additional steps of the calibration method in FIG. 1 in accordance with some embodiments of the present invention. As shown in FIG. 5, after step S106 in FIG. 1 is performed, the calibration method of the present invention determines whether there is enough time available before finishing the calculations of the first reflection coefficient sets of the tuner in step S104 and the second impedance from the feedback end to the input end of the tuner in step S106 for all the calibration settings, which are short, open, and load (step S500). In some embodiments, the calibration method of the present invention may find available timing for changing predetermined setting of the tuner before step S100 in FIG. 1 is performed.

In some embodiments, if the answer of step S500 is yes, the calibration method of the present invention performs step S100 in FIG. 1 again. If the answer of step S500 is no, the calibration method of the present invention switches back to the original tuner setting (step S502). In some embodiments, the original tuner setting is used for the mobile device to receive or transmit communication signals with other mobile device or the base station. That is, if the answer of step S500 is no, the calibration method of the present invention is end and the mobile device operates in normal for communication.

Figure 6:
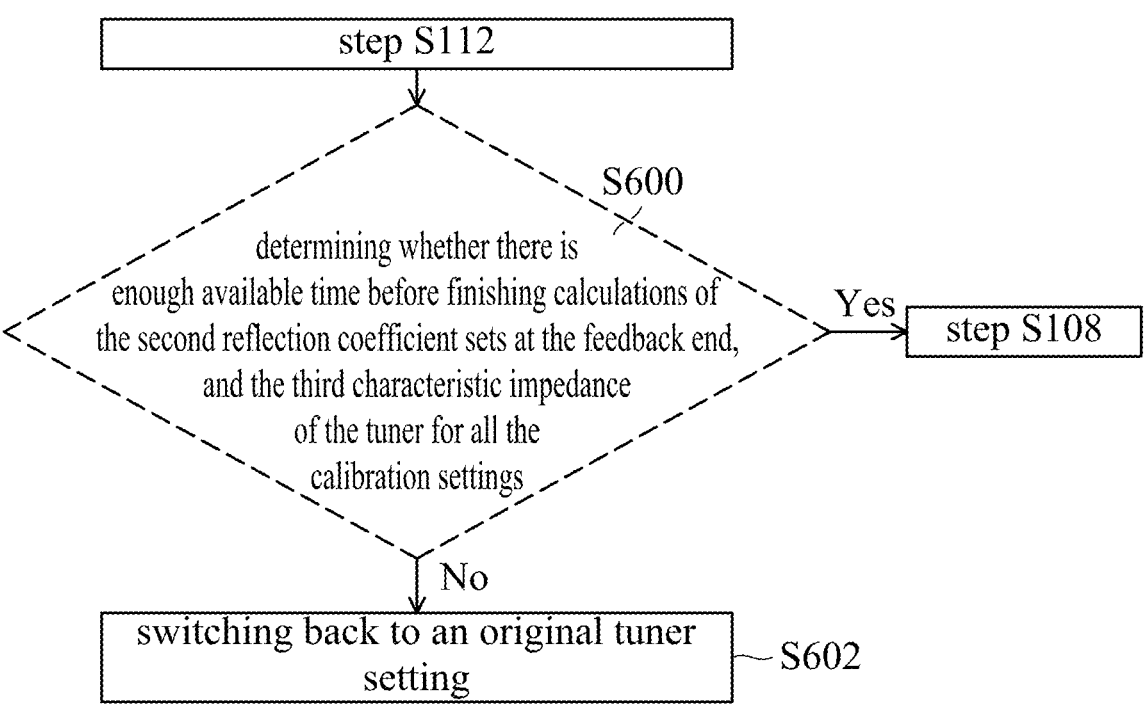
FIG. 6 is a flow chart of additional steps of the calibration method in FIG. 1 in accordance with some embodiments of the present invention.

FIG. 6 is a flow chart of additional steps of the calibration method in FIG. 1 in accordance with some embodiments of the present invention. As shown in FIG. 6, after step S112 in FIG. 1 is performed, the calibration method of the present invention determines whether there is enough time available before finishing the calculations of the second reflection coefficient sets at the feedback end in step S110, and the third impedance of the tuner in step S112 for all the calibration settings (step S600). In some embodiments, the calibration method of the present invention may find available timing for changing predetermined setting of the tuner before step S108 in FIG. 1 is performed.

In some embodiments, if the answer of step S600 is yes, the calibration method of the present invention performs step S108 in FIG. 1 again. If the answer of step S600 is no, the calibration method of the present invention switches back to the original tuner setting (step S602). Similarly, the original tuner setting is used for the mobile device to receive or transmit communication signals with other mobile device or the base station. That is, if the answer of step S600 is no, the calibration method of the present invention is end and the mobile device operates in normal for communication.

Figure 7:
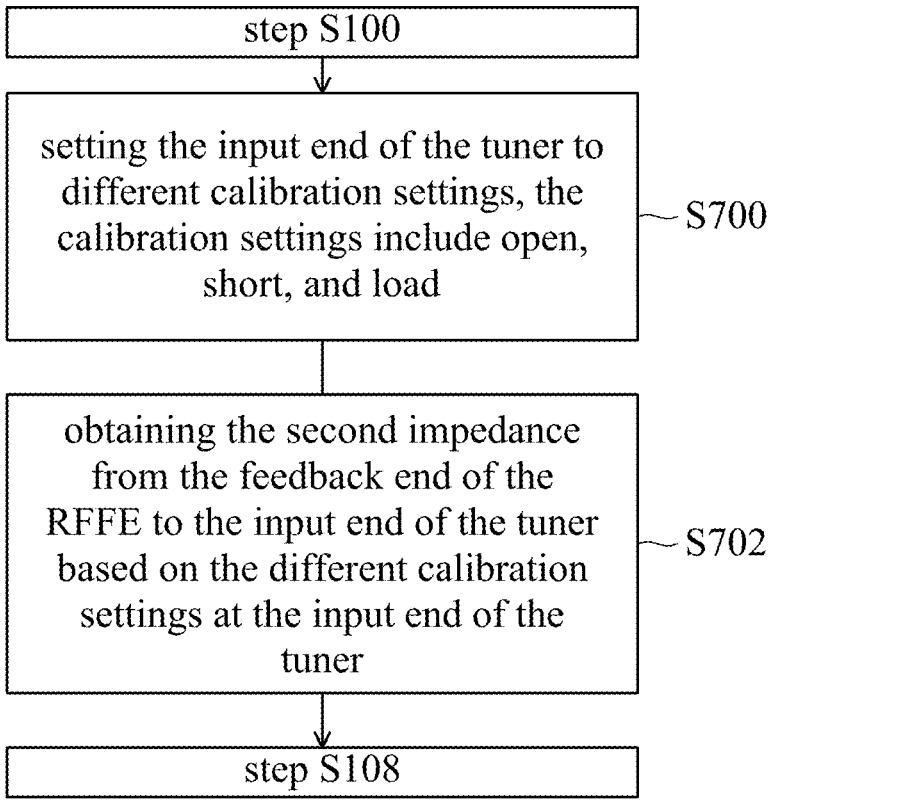
FIG. 7 is a flow chart of additional steps of the calibration method in FIG. 1 in accordance with some embodiments of the present invention.

FIG. 7 is a flow chart of additional steps of the calibration method in FIG. 1 in accordance with some embodiments of the present invention. In some embodiments, the additional steps in FIG. 7 are performed when the tuner is able to install external kits at the input end of the tuner or set internal kits at the input end of the tuner. As shown in FIG. 7, after step S100 in FIG. 1 is performed, the calibration method of the present invention sets the input end of the tuner to said calibration setting (step S700). Then, the calibration method of the present invention obtains the second impedance from the feedback end of the RFFE to the input end of the tuner based on said calibration setting at the input end of the tuner (step S702). After the second impedance from the feedback end of the RFFE to the input end of the tuner is obtained, the calibration method of the present invention continuously perform step S108 in FIG. 1.

In some embodiments, when the tuner is able to install external kits at the input end of the tuner or set internal kits at the input end of the tuner, steps S102, S104, and S106 in FIG. 1 can be replace by steps S700 and S702 in FIG. 7. In some embodiments, steps S700 and S702 can also be performed after step S106 in FIG. 1 to double verify the second impedance from the feedback end of the RFFE to the input end of the tuner. In some embodiments of step S702, the calibration method of the present invention obtains the second impedance from the feedback end of the RFFE to the input end of the tuner by calculation.

Figure 8:
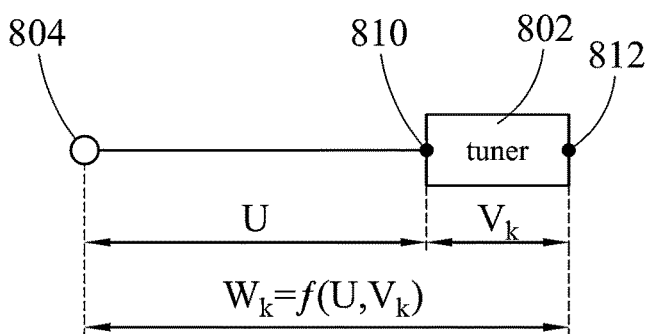
FIG. 8 is a schematic diagram of a radio frequency front-end (RFFE) 800 in accordance with some embodiments of the present invention.

FIG. 8 is a schematic diagram of a radio frequency front-end (RFFE) 800 in accordance with some embodiments of the present invention. In some embodiments, the RFFE 800 is included in a mobile device, such as a smart phone, and a tablet, but the present invention is not limited thereto. The mobile device further includes a processor (not shown) to execute a calibration algorithm to find a real-time impedance of the RFFE 800. That is, the processor executes the calibration algorithm to perform steps S100~S112 in FIG. 1. As shown in FIG. 8, the RFFE 800 includes a tuner 802 and a feedback end 804. The tuner 802 includes an input end 810 and an output end 812. In some embodiments of FIG. 8, the input end 810 is coupled to the feedback end 804, and the output end 812 is coupled to an antenna (not shown) of the mobile device.

In some embodiments of FIG. 8, a matrix U is the impedance from the feedback end 804 to the input end 810 of the tuner 802. A matrix $V_k$ is the impedance of the tuner. A matrix $W_k$ is the reflection impedance from the feedback end to the tuner output end 804. Letter k is a number corresponding to the index of the predetermined settings of the tuner 802. In some embodiments, the matrix U and the matrix $V_k$ are variables of the matrix $W_k$, that is, $W_k$=f(U, $V_k$). For example, the processor of the mobile device sets the tuner 802 to a first predetermined setting. The tuner 802 has a first impedance equal to a matrix $V_{1st}$ in the first predetermined setting. The processor sets the output end 812 of the tuner 802 to different calibration settings. The calibration settings include open, short, and load. The processor obtains first reflection coefficient sets that are equal to a matrix $W_{1st}$ at the feedback end 804. Since the first impedance equal to the matrix $V_{1st}$ is known, the processor calculates a second impedance equal to the matrix U from the feedback end 804 of the RFFE 800 to the input end 810 of the tuner 802 based on the first reflection coefficient sets equal to the matrix $W_{1st}$.

After that, the processor sets the tuner to a second predetermined setting. The processor obtains second reflection coefficient sets equal to a matrix $W_{2nd}$ at the feedback end 804. Since the second impedance equal to the matrix U is obtained, the processor calculates a third impedance equal to a matrix $V_{2nd}$ of the tuner 802 in the second predetermined setting based on the second impedance equal to the matrix U from the feedback end 804 of the RFFE 800 to the input end 810 of the tuner 802 and the second reflection coefficient sets equal to the matrix $W_{2nd}$. In some embodiments, the processor sets the input end 810 of the tuner 802 to said calibration setting. Thus, the processor obtains the second impedance equal to the matrix U from the feedback end 804 of the RFFE 800 to the input end 810 of the tuner 802 based on said calibration setting at the input end 810 of the tuner 802.

Figure 9A:
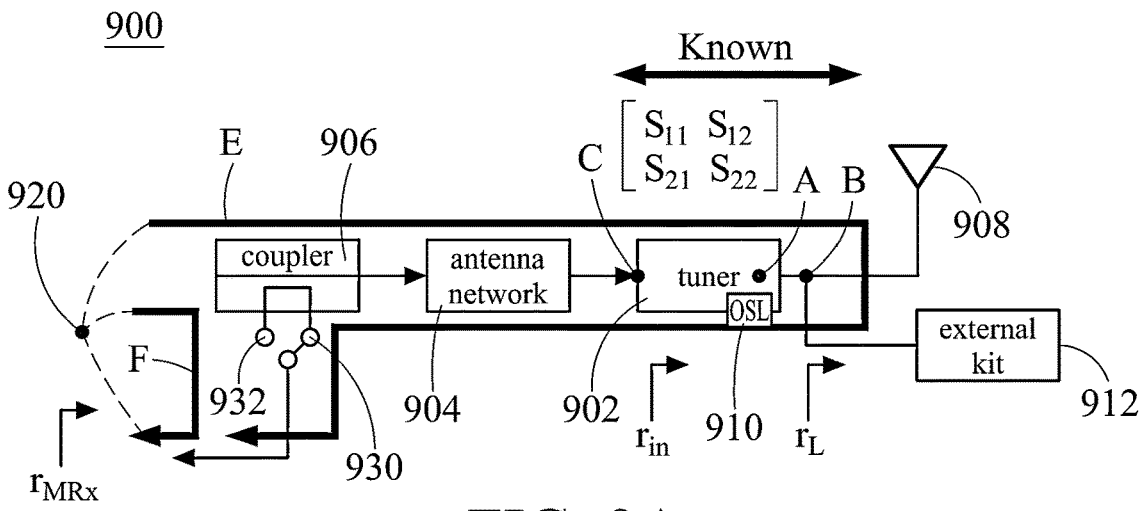
FIG. 9A is a schematic diagram of an RFFE 900 performing steps S100~S106 in FIG. 1 in accordance with some embodiments of the present invention.

FIG. 9A is a schematic diagram of an RFFE 900 performing steps S100~S106 in FIG. 1 in accordance with some embodiments of the present invention. In some embodiments, the RFFE 900 is included in a mobile device, such as a smart phone, and a tablet, but the present invention is not limited thereto. The mobile device further includes a processor (not shown) to execute a calibration algorithm to find a real-time impedance of the RFFE 900. That is, the processor executes the calibration algorithm to perform steps S100~S106 in FIG. 1. As shown in FIG. 9A, the RFFE 900 includes a tuner 902, an antenna network 904, a coupler 906, an antenna 908, external kits 912, and a feedback end 920. The tuner 902 includes an input end C and an output end A. In some embodiments of FIG. 9A, the coupler 906 is electrically connected to the feedback end 920 of the RFFE 900. The coupler 906 includes an internal switch with nodes 930 and 932. The antenna network 904 is electrically connected between the coupler 906 and the tuner 902. The external kits are connected to a node B between the output end A of the tuner 902 and the antenna 908. In some embodiments, the antenna network 904 is the remaining circuits in the RFFE 900 except the tuner 902 and the coupler 906, but the present invention is not limited thereto. The tuner 902 includes internal kit (OSL) 910.

In step S100, the processor of the mobile device sets the tuner 902 to a first predetermined setting. The tuner 902 has a first impedance equal to a matrix $$\begin{bmatrix} S_{11} & S_{12} \\ S_{21} & S_{22} \end{bmatrix},$$

which is originally known, in the first predetermined setting. In step S102, the processor sets the output end A of the tuner 902 to open, short, or load by either the external kits 912 or the internal kits 910. In step S104, the processor obtains a reflection coefficient $\Gamma_{MRx}$ at the feedback end 920. In detail, the processor inputs a modulation signal or a tone-signal into the feedback end 920 of the RFFE 900 through paths E and F to obtain the reflection coefficient $\Gamma_{MRx}$ at the feedback end 906. For example, the switch in the coupler 906 is first connected to the node 930, so that the modulation signal or the tone-signal can be transmitted through the path E. Then, the switch in the coupler 906 is connected to the mode 932, so that the modulation signal or the tone-signal can be transmitted through the path F. The reflection coefficient $\Gamma_{MRx}$ at the feedback end 920 can be obtained by strength of the receiving signals from the paths E and F.

In step S106, the processor calculates a second impedance from the feedback end 920 of the RFFE 900 to the input end C of the tuner 902 based on the reflection coefficient $\Gamma_{MRx}$. Since the first impedance equal to the matrix $$\begin{bmatrix} S_{11} & S_{12} \\ S_{21} & S_{22} \end{bmatrix}$$

in step S100 is known, the second impedance from the feedback end 920 of the RFFE 900 to the input end C of the tuner 902 can be obtained by having a matrix calculation with an inverse matrix $$\begin{bmatrix} S_{11} & S_{12} \\ S_{21} & S_{22} \end{bmatrix}^{-1}$$

and the reflection coefficient $\Gamma_{MRx}$.

Figure 9B:
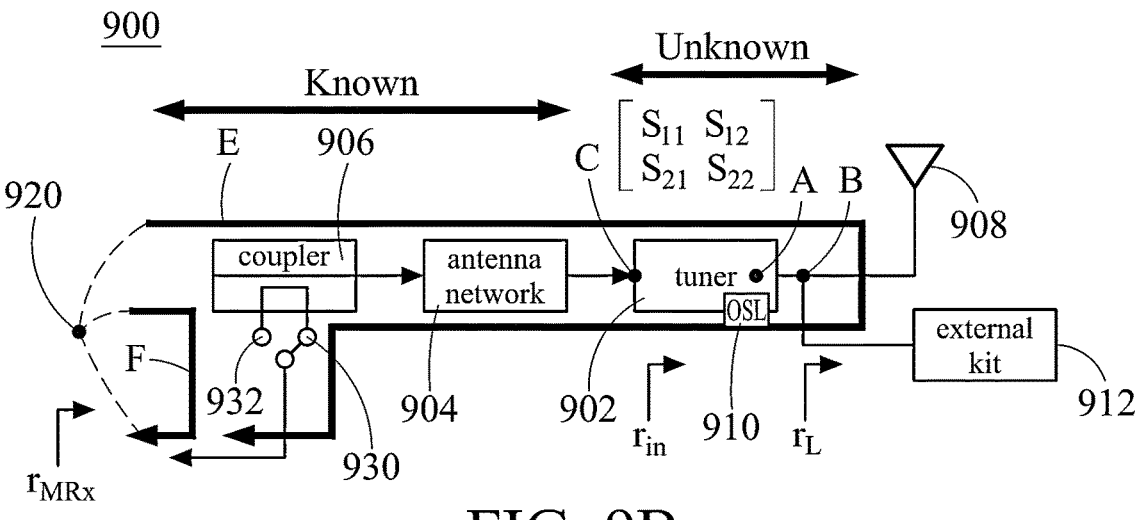
FIG. 9B is a schematic diagram of the RFFE 900 performing steps S108~S112 in FIG. 1 in accordance with some embodiments of the present invention.

FIG. 9B is a schematic diagram of the RFFE 900 performing steps S108~S112 in FIG. 1 in accordance with some embodiments of the present invention. The processor of the mobile device executes the calibration algorithm to perform steps S108~S112 in FIG. 1. As shown in FIG. 9B, in step S108, the processor sets the tuner 902 to a second predetermined setting. The impedance of the tuner 902 in the second predetermined setting is now unknown or still need to be calibrated. In step S110, the processor obtains a reflection coefficient $\Gamma_{MRx}$ at the feedback end 920. In detail, the processor inputs a modulation signal or a tone-signal into the feedback end 920 of the RFFE 900 through paths E and F to obtain the reflection coefficient $\Gamma_{MRx}$ at the feedback end 906. For example, the switch in the coupler 906 is first connected to the node 930, so that the modulation signal or the tone-signal can be transmitted through the path E. Then, the switch in the coupler 906 is connected to the mode 932, so that the modulation signal or the tone-signal can be transmitted through the path F. The reflection coefficient $\Gamma_{MRx}$ at the feedback end 920 can be obtained by strength of the receiving signals from the paths E and F.

In step S112, since the second impedance from the feedback end 920 of the RFFE 900 to the input end C of the tuner 902 is known in step S106, and the reflection coefficient $\Gamma_{MRx}$ at the feedback end 920 is obtained in step S110, the processor calculates a third impedance (for example, a matrix $$\left( \begin{bmatrix} S_{11} & S_{12} \\ S_{21} & S_{22} \end{bmatrix} \right)$$

of the tuner 902 in the second predetermined setting based on the second impedance from the feedback end 920 of the RFFE 900 to the input end C of the tuner 902 and the reflection coefficient $\Gamma_{MRx}$.

In steps S102 and S108, the output end A of the tuner 902 or the node B may be connected to a port of a spectrum analyzer, and the spectrum analyzer may set the impedance of the port to open, short, or load. Therefore, the output end A of the tuner 902 or the node B can be set to open, short, or load due to the connection with the port of the spectrum analyzer.

When the mobile device operates in normal for communication, the external kits 912 and the internal kits 910 are not attached, the processor of the mobile device may detect the environmental change through a reflection coefficient $\Gamma_L$ and a reflection coefficient $\Gamma_{in}$ measured via the antenna 908. That is, when the environment around the mobile device changes, the reflection coefficient $\Gamma_L$ and the reflection coefficient Tin may also be changed. Therefore, the processor of the mobile device may select a proper calibration setting stored in the memory, so that the impedance corresponding to the proper calibration setting may be used to compensate for the impedance change due to the environmental change.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A calibration method to find an impedance of a radio frequency front-end (RFFE), wherein the RFFE comprises a feedback end and a tuner, the tuner comprises an input end coupled to the feedback end and an output end coupled to an antenna, the method comprising:

setting the tuner to a first predetermined setting; wherein the tuner has a first impedance in the first predetermined setting;

setting the output end of the tuner to different calibration settings; wherein the calibration settings comprise open, short, and load;

obtaining first reflection coefficient sets at the feedback end;

calculating a second impedance from the feedback end of the RFFE to the input end of the tuner based on the first reflection coefficient sets;

setting the tuner to a second predetermined setting;

obtaining second reflection coefficient sets at the feedback end; and calculating a third impedance of the tuner in the second predetermined setting based on the second impedance from the feedback end of the RFFE to the input end of the tuner and the second reflection coefficient sets.

2. The calibration method as claimed in claim 1, further comprising:

finishing the method after calculating the first reflection coefficient sets at the feedback end, the second impedance from feedback end of the RFFE to the tuner input, the second reflection coefficient sets at the feedback end, and the third impedance of the tuner for all the calibration settings.

3. The calibration method as claimed in claim 2, further comprising:

determining that there is enough available time before finishing calculations of the first reflection coefficient sets at the feedback end and the second impedance from the feedback end to the input end of the tuner for all the calibration settings; and returning to the step of setting the tuner to the first predetermined setting.

4. The calibration method as claimed in claim 2, further comprising:

determining that there is not enough time available before finishing calculations of the first reflection coefficient sets at the feedback end and the second impedance from the feedback end to the input end of the tuner for all the calibration settings; and switching back to an original tuner setting.

5. The calibration method as claimed in claim 2, further comprising:

determining that there is enough time available before finishing calculations of the second reflection coefficient sets at the feedback end, and the third impedance of the tuner for all the calibration settings; and returning to the step of setting the tuner to the second predetermined setting.

6. The calibration method as claimed in claim 2, further comprising:

determining that there is not enough time available before finishing calculations of the second reflection coefficient sets at the feedback end, and the third impedance of the tuner for all the calibration settings; and switching back to the original tuner setting.

7. The calibration method as claimed in claim 1, wherein the third impedance of the tuner in the second predetermined setting is an S parameter of the tuner in the second predetermined setting.

8. The calibration method as claimed in claim 1, wherein the first impedance, the first reflection coefficient sets at the feedback end, the second impedance at the feedback end, the second reflection coefficient sets at the feedback end, and the third impedance of the tuner are matrices.

9. The calibration method as claimed in claim 8, wherein the step of calculating the second impedance from the feedback end of the RFFE to the input end of the tuner based on the first reflection coefficient sets comprises:

calculating an inverse matrix of the first impedance of the tuner in the first predetermined setting; and obtaining the second impedance from the feedback end of the RFFE to the input end of the tuner by having a matrix calculation with the first reflection coefficient sets at the feedback end and the inverse matrix of the first impedance of the tuner in the first predetermined setting.

10. The calibration method as claimed in claim 8, wherein the step of calculating the third impedance of the tuner in the second predetermined setting based on the second impedance from the feedback end of the RFFE to the input end of the tuner and the second reflection coefficient sets comprises:

calculating an inverse matrix of the second impedance from the feedback end of the RFFE to the input end of the tuner in the second predetermined setting; and obtaining the third impedance of the tuner in the second predetermined setting by having a matrix calculation with the second reflection coefficient sets and the inverse matrix of the second impedance from the feedback end of the RFFE to the input end of the tuner.

11. The calibration method as claimed in claim 1, further comprising:

setting the input end of the tuner to the different calibration settings; and obtaining the second impedance from the feedback end of the RFFE to the input end of the tuner based on the different calibration settings at the input end of the tuner.

12. The calibration method as claimed in claim 1, further comprising:

repeating the step of setting the tuner to the first predetermined setting after performing the step of calculating the third impedance of the tuner in the second predetermined setting based on the second impedance from the feedback end of the RFFE to the input end of the tuner and the second reflection coefficient sets.

13. The calibration method as claimed in claim 1, wherein the step of obtaining the first reflection coefficient sets at the feedback end comprises:

inputting a modulation signal or a tone-signal into the feedback end of the RFFE to obtain the first reflection coefficient sets at the feedback end; and obtaining the first reflection coefficient sets by calculation.

14. The calibration method as claimed in claim 1, wherein the step of obtaining the second reflection coefficient sets at the feedback end comprises:

inputting a modulation signal or a tone-signal into the feedback end of the RFFE to obtain the second reflection coefficient sets at the feedback end; and obtaining the second reflection coefficient sets by calculation.

15. The calibration method as claimed in claim 1, wherein the calibration method is performed in any period without transmission or reception in an over-the-air (OTA) environment.

16. The calibration method as claimed in claim 1, wherein the RFFE further comprises a coupler and an antenna network; the coupler is electrically connected to the feedback end of the RFFE; and the antenna network is electrically connected between the coupler and the tuner.

17. The calibration method as claimed in claim 1, wherein the step of setting the output end of the tuner to the different calibration settings comprises:

installing external calibration kits relative to the different calibration settings at the output end of the tuner; or connecting the output end of the tuner to a port of a spectrum analyzer, and setting an impedance of the port to the different calibration settings.

18. The calibration method as claimed in claim 1, further comprising:

associating the third impedance of the tuner with the second predetermined setting to generate mapping data; and storing the mapping data in a memory.

19. The calibration method as claimed in claim 1, wherein the step of setting the input end of the tuner to the different calibration settings comprises setting the input end of the tuner to the different calibration settings by simulation, calculation, or measurement.

20. The calibration method as claimed in claim 1, wherein the step of setting the output end of the tuner to the different calibration settings comprises:

setting the output end of the tuner to the different calibration settings by simulation or calculation.

\* \* \* \* \*